March 8, 1932. J. BAUER 1,848,408

METHOD OF BONDING STELLITE TO BRONZE OR BRASS

Filed Aug. 13, 1930

Inventor
Joseph Bauer

Patented Mar. 8, 1932

1,848,408

UNITED STATES PATENT OFFICE

JOSEPH BAUER, OF CINCINNATI, OHIO

METHOD OF BONDING STELLITE TO BRONZE OR BRASS

Application filed August 13, 1930. Serial No. 475,088.

This invention was made with an object of overcoming the excessive wear and consequent expense of replacements in certain machine elements, such as the feeder fingers of presses which are employed to lithograph sheets of tin or other metal in can factories and other industries, where metal sheets are fed one at a time by such fingers during the operation of the press or for other machinery.

A further object is to so construct press feeder fingers or other machine elements of a somewhat similar nature that they are rendered inexpensive of construction and of a metal which readily adapts them to easy working, with a consequent saving of time, stoppage of machinery and waste of materials which is now prevalent.

These and other objects are attained in the method I am about to describe and which is illustrated in the accompanying drawings, in which.

Figure 1:
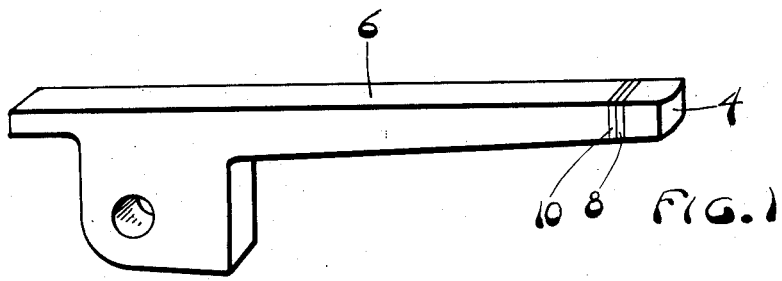
Fig. 1 is a perspective view of a press feeder finger chosen as an example of the application of my improved method to a machine element.
Figure 2:
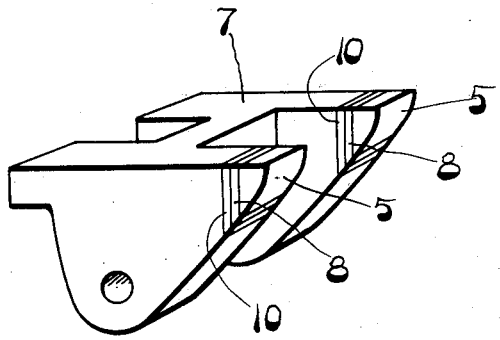
Fig. 2 is a perspective view of another machine element to which my improved method has been applied.

The examples shown in Figs. 1 and 2, showing fingers such as are used in presses which lithograph sheets of tin and other metal, employ sheet-engaging tips 4 and 5 of stellite, which are welded to the bronze bodies 6 and 7 respectively of these elements by the method I will describe herein. Stellite is an alloy of especially hard, close grain and high fushion point steel, which renders it especially difficult to work by cutting and to weld. However, it is quite desirable for use for certain purposes, as for example, the tips of such elements as I have shown. It would be, in view of the high cost of this steel, as well as the difficulty with such steel is worked, highly impractical to make such elements entirely of such material, hence, I have developed the method now to be described, in order that the application of stellite to the tips or faces of brass, bronze or other metal elements may be easily accomplished.

In carrying out my improved method the bronze body 6 or 7 has its tip or tips cut off sufficiently and new tips are then added, of the stellite which is so desirable for tipping elements to be subjected to the wear and tear of the press fingers shown. Preparatory to actually tipping the fingers, the steps shown in Fig. 3 and now described, are carried out. There is first provided a strip of cold rolled steel 8 in the form of a layer upon which chunks of stellite 9 are welded to make the two steels of one piece. The welding or bonding of these two steels may be accomplished through a spot welding process, either acetylene or electric, so that the bonding may be accomplished without the use of flux. Then I provide a brass strip 10 which is bonded to the cold rolled steel strip by brazing it thereto with borax used as a flux, as is common practice when joining cold rolled steel and brass. The third step in the method consists in now brazing the brass layer of the tip to the bronze of the finger body, using borax as a flux as is also common practice. Thus, in general, is the method of bonding stellite to brass or bronze accomplished in a simple but effective manner, by a series of transitionary steps, each of which is essential to the actual union of the metals through fusion.

No direct fusion of the bronze to the stellite would of course be possible, because of the terrific heat required to bring the stellite to a state of fusion, which heat would cause the brass or bronze to burn or oxidize hopelessly thus preventing its utility as a metal. For this reason I have provided for the series of thin metal layers which in gradual steps of fusion heat will readily bond in this manner, one into the other, until the metals requiring the least or lowest fusion temperature are finally reached.

It will be observed that it is essential for the steps to be taken in a manner such that the metals requiring the highest fusion temperatures are fused first, then the metals which may be fused with a somewhat lower temperature are fused next, and finally the metals which may be fused with the lowest fusion temperature are fused.

Figure 3:
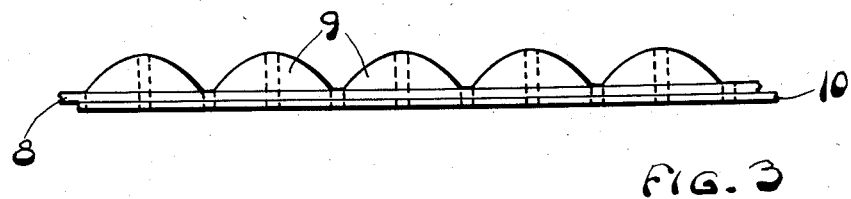
Fig. 3 is a view designed to illustrate one manner in which my improved method may be placed in effect.

In actually performing the steps of the method just described, I have provided for the use of relatively thin strips of cold rolled steel and brass 8 and 10, in as much as a great amount of these metals is not required as layers between the stellite tips and the bronze body of each element, in order that the proper bonding may be effected. The chunks of stellite 9, the cold rolled steel 8 and the brass strip 10, having been fused as has been described, it is next necessary to grind the chunks 9 to the desired face contour and, as shown in Fig. 3, to then separate the chunks along such lines as indicated by dots, by grinding. This is necessary because stellite is too hard to cut with present day tools and therefore the separation and shaping must be done by grinding. With the tips thus prepared it is a very simple matter to braze them in place as has been stated.

Wide variations of temperature are employed in the welding steps I have described, the steel to steel weld being accomplished at a temperature in excess of 3000 degrees, the steel to brass weld at approximately 1600 degrees, and the brass to bronze weld at approximately the same 1600 degrees temperature.

A feature of my method of welding stellite to bronze is that it thus enables me to provide fingers which, because they are non-magnetic, may be readily employed in the handling of tin, iron or thin steel sheets. Such magnetism would interfere with proper manipulation of the sheets and operation of the fingers. Yet, I have in this manner provided a hard and tough finger tip, such as can only be obtained through the use of stellite, while at the same time having a finger which is non-magnetic. Besides through my method I am enabled thereby to add many times to the working life of the finger, saving time and expense over the method now in vogue, by preventing loss consequent to stoppage of machinery and the time and labor of changing worn to non-worn fingers.

Having thus described my invention what I claim is:—

A method of bonding stellite to bronze, consisting in welding to the face of the stellite a surface of cold rolled steel, brazing to the surface of the cold rolled steel a surface of brass, and brazing the surface of the brass to the bronze.

In witness whereof, I affix my signature.

JOSEPH BAUER.